United States Patent [19]

Roth

[11] 4,349,575
[45] Sep. 14, 1982

[54] METHOD FOR FREEZING AND FORMING MEAT PATTIES

[76] Inventor: Eldon N. Roth, 99 Madera Ct., San Ramon, Calif. 94583

[21] Appl. No.: 187,370

[22] Filed: Sep. 15, 1980

[51] Int. Cl.$^3$ .............................. A23B 4/06; A23L 1/31
[52] U.S. Cl. ....................................... 426/513; 62/346; 426/517; 426/524
[58] Field of Search ................ 426/515, 517, 524, 521, 426/512, 417; 62/346, 345; 165/90, 89

[56] References Cited

U.S. PATENT DOCUMENTS

| | | |
|---|---|---|
| 788,446 | 4/1905 | Wilson . |
| 888,680 | 5/1908 | Wright . |
| 1,582,158 | 4/1926 | Bennett . |
| 1,583,484 | 5/1926 | Morrison et al. |
| 1,806,066 | 5/1931 | Kremmling . |
| 1,823,725 | 9/1931 | Carney . |
| 2,007,837 | 7/1935 | Rudd et al. |
| 2,140,788 | 12/1938 | Cowgill . |
| 2,478,465 | 4/1949 | Dodson . |
| 2,539,232 | 1/1951 | Dempster . |
| 2,634,458 | 4/1953 | Elsaesser . |
| 2,670,296 | 2/1954 | Tansley . |
| 2,708,287 | 5/1955 | Long et al. |
| 2,814,921 | 12/1957 | Beerend . |
| 2,837,761 | 6/1958 | Stiegler . |
| 2,936,073 | 5/1960 | Thompson . |
| 3,132,949 | 5/1964 | Crowe . |
| 3,137,029 | 6/1964 | Zolt . |
| 3,245,801 | 4/1966 | Kulk . |
| 3,315,619 | 4/1967 | Slaybaugh . |
| 3,347,176 | 10/1967 | Hall . |
| 3,405,209 | 10/1968 | Aagaard et al. |
| 3,436,927 | 4/1969 | Gruber . |
| 3,478,439 | 11/1969 | Hyldon . |
| 3,499,957 | 3/1970 | Ancker . |
| 3,728,136 | 4/1973 | Langlands . |
| 3,731,345 | 5/1973 | Brackman . |
| 3,750,232 | 8/1973 | Holly . |
| 3,774,409 | 11/1973 | Persson et al. |
| 3,852,507 | 12/1974 | Toby . |
| 3,891,376 | 6/1975 | Gersbeck et al. |
| 3,898,026 | 8/1975 | Sauer et al. . |
| 3,938,927 | 2/1976 | Brinkman et al. |
| 3,947,168 | 3/1976 | Ujihara et al. |
| 3,956,517 | 5/1976 | Curry et al. . |
| 4,098,095 | 7/1978 | Roth . |
| 4,138,768 | 2/1979 | Roth . |
| 4,239,785 | 12/1980 | Roth ................................... 426/517 |

OTHER PUBLICATIONS

Tressler et al., The Freezing Preservation of Foods, Published by the AVI Publishing Co., Inc., "Freezing Method", vol. 3, pp. 202–203 (1968).

Primary Examiner—Raymond N. Jones
Assistant Examiner—George C. Yeung
Attorney, Agent, or Firm—Fitch, Even, Tabin, Flannery & Welsh

[57] ABSTRACT

An improved method for freezing viscous paste materials such as ground meat by applying it in a selected thickness to the refrigerated surface of a rotating drum, the material being removed from the drum as a flat continuous sheet and cut into patties. Various improvements include the conditioning of both surfaces of the patties, scoring at least one surface of the patty in order to improve quality during and after subsequent cooking and reheating a thin surface portion of the frozen sheet or patties in order to maintain natural color.

15 Claims, 2 Drawing Figures

METHOD FOR FREEZING AND FORMING MEAT PATTIES

The invention is described herein with reference to U.S Pat. No. 4,098,095, issued July 4, 1978 and entitled "REFRIGERATING APPARATUS FOR VISCOUS PASTE SUBSTANCE" as well as copending patent applications Ser. No. 778,492, filed Mar. 17, 1977 for "APPARATUS AND METHOD FOR FORMING FROZEN MEAT PATTIES", now U.S. Pat. No. 4,138,768, and Ser. No. 849,166, filed Nov. 7, 1977, now abandoned, for "PROCESS FOR REFRIGERATING PROTEIN MATERIALS," each of these references having the same inventor as the instant invention. The first noted reference describes a refrigerated drum of the type used in the present invention for freezing meat or other protein materials which had preferably been previously heated to render and remove fat materials. The second noted reference describes apparatus and a method employing a similar refrigerated drum in combination with means for forming individual patties. The last noted reference discloses details of a process for refrigerating protein material which could, for example, be carried out with the apparatus disclosed in the first noted reference.

The present invention relates to a method and apparatus for freezing and forming patties of protein-containing materials, and more particularly to improvements in such a method and apparatus to assure uniform quality in the patties. The invention preferably contemplates the freezing and formation of patties consisting of ground meat products. Even more preferably, the invention contemplates a method and apparatus for freezing and forming hamburger patties which are to be subsequently cooked.

Generally, products of the type contemplated for forming into frozen patties according to the present invention are characterized as being in a solid state prior to refrigeration or freezing. Thus, the term "viscous paste" is used herein to define the material prior to refrigeration or freezing. Similarly, as was noted in at least one of the above references, the term "viscous paste" is contemplated as including ground, rendered, or otherwise divided protein materials, for example, ground beef or hamburger, ground pork, deboned beef or pork, various poultry meats, defatted pork and even protein materials derived from vegetables such as spinach, squash soybeans and the like. Thus, although the invention is described below and particularly contemplates the formation of frozen patties consisting of hamburger meat, it will be apparent that the method and apparatus of the invention could also be employed for forming patties from other materials such as those listed above.

As was set forth in one of the above-noted references, protein materials of the type contemplated by the present invention tend to be susceptible to an increase of bacterial count, particularly when the material is stored at or about room temperature. Thus, it is important to rapidly process and subsequently refrigerate the material for storage in order to minimize increases in the bacterial count for the protein material. These factors are discussed at length in the references described above.

Food patties and particularly meat patties contemplated for use in sandwiches are produced in great quantities. It has therefore become essential to provide efficient and economical means for producing such patties while maintaining quality control in terms of uniform size and density as well as uniform response of the patties to subsequent cooking and also assuring high standards of uniform appearance and taste in the patties. The use of a freezer drum as disclosed in the above-noted references has been found to be particularly valuable as a means for overcoming certain of these problems. In addition, the use of such a freezer drum is also contemplated as an important element in the method and apparatus of the present invention.

SUMMARY OF THE INVENTION

It is therefore an object of the invention to provide an improved method and apparatus for freezing and forming patties from protein materials having a viscous paste consistency, the method and apparatus including the use of a rotating drum having a refrigerated surface upon which the protein-containing material is frozen before being formed into patties.

It is particularly an object of the invention to provide an improved method and apparatus for enhancing quality and uniformity of patties formed from the protein-containing material, the protein-containing material preferably being a ground meat product.

A number of improvements are contemplated by the present invention within the method and apparatus for freezing and forming patties. These various novel improvements are disclosed in combination since they may be used separately or in combination to enhance the quality and uniformity of the patties.

Initially, the invention contemplates a method and apparatus for freezing and forming patties wherein protein material such as ground meat is applied to the surface of a refrigerated drum, the invention particularly contemplating a method and means for developing and conditioning both sides of the patty, for example, to prevent curling during subsequent cooking of the patty. As noted above, the material is preferably formed into patties after being frozen as a continuous sheet on the surface of the drum. The surface of the drum itself provides means for conditioning one surface of the patties. At the same time, an endless belt or similar means is operated in conjunction with the drum to condition the other surface of the patties. It is preferably contemplated that the surface of the drum be cleaned prior to each application of protein material thereupon in order to remove material adhering to the drum surface such as frost or the like which might otherwise interfere with surface formation or other qualities of the patties.

The belt employed in conjunction with the drum freezer to condition the other or external surface of the patty sheet is preferably trained about a refrigerated application roller and housed in a refrigerated chamber to further facilitate proper conditioning of both surfaces of the sheet. The application roller may be hollow with suitable refrigeration means therein to facilitate initial refrigeration of the outer surface of the patty sheet through the endless belt.

Still further, the invention contemplates a method and apparatus for scoring at least one surface of the patties primarily in order to reduce subsequent cooking time. Scoring referred to above is preferably accomplished after the patty sheet is frozen or even after the individual patties are formed. Scoring may be accomplished, for example, by means of one or more knife edges passing either parallel to or transverse to the direction of travel of the patties or sheet material.

It has been found that when protein materials such as ground meat are rapidly frozen at low temperatures, dehydration of at least a surface portion of the patty or sheet material may result in an undesirable gray color. Accordingly, the present invention also contemplates a method and means for surface conditioning of the patties or frozen sheet of protein material to remove the undesirable color. Preferably a thin surface portion of the material is reheated, the material thereafter being permitted to refreeze at a slower rate in order to maintain normal color of the protein material. Where the protein material is formed from red meat, this process would of course be intended to maintain a red color upon the surface of the patties or frozen sheet. The surface heating may be accomplished for example by means of a hot roller, steam means, electrical heat source or the like.

Surface reheating of the frozen sheet of material has also been found to "temper" the meat or other material and prevent it from cracking or crumbling when individual patties are subsequently punched or formed from the sheet.

As noted above, the protein material is preferably frozen upon the drum in a continuous sheet and formed into patties after removal from the drum in a frozen condition. A variety of cutting or punching assemblies may be employed to form a frozen sheet of the protein material into individual patties of uniform size. However, the invention also contemplates means for straightening the sheet after removal from the drum to eliminate curvature produced in the sheet when it is frozen on the drum. Preferably, this is accomplished by removing the sheet from the drum with a knife edge and then supporting the sheet on a flat surface arranged tangentially to the drum at the point where the sheet is removed from the drum by the knife edge.

A number of objects and advantages of the invention have been separately described above which may be employed in various combinations in order to produce protein-containing patties of superior quality and uniformity. Additional objects and advantages of the invention are also made apparent in the following description having reference to the accompanying drawings.

DESCRIPTION OF THE PREFERRED EMBODIMENTS

Figures 1, 2:
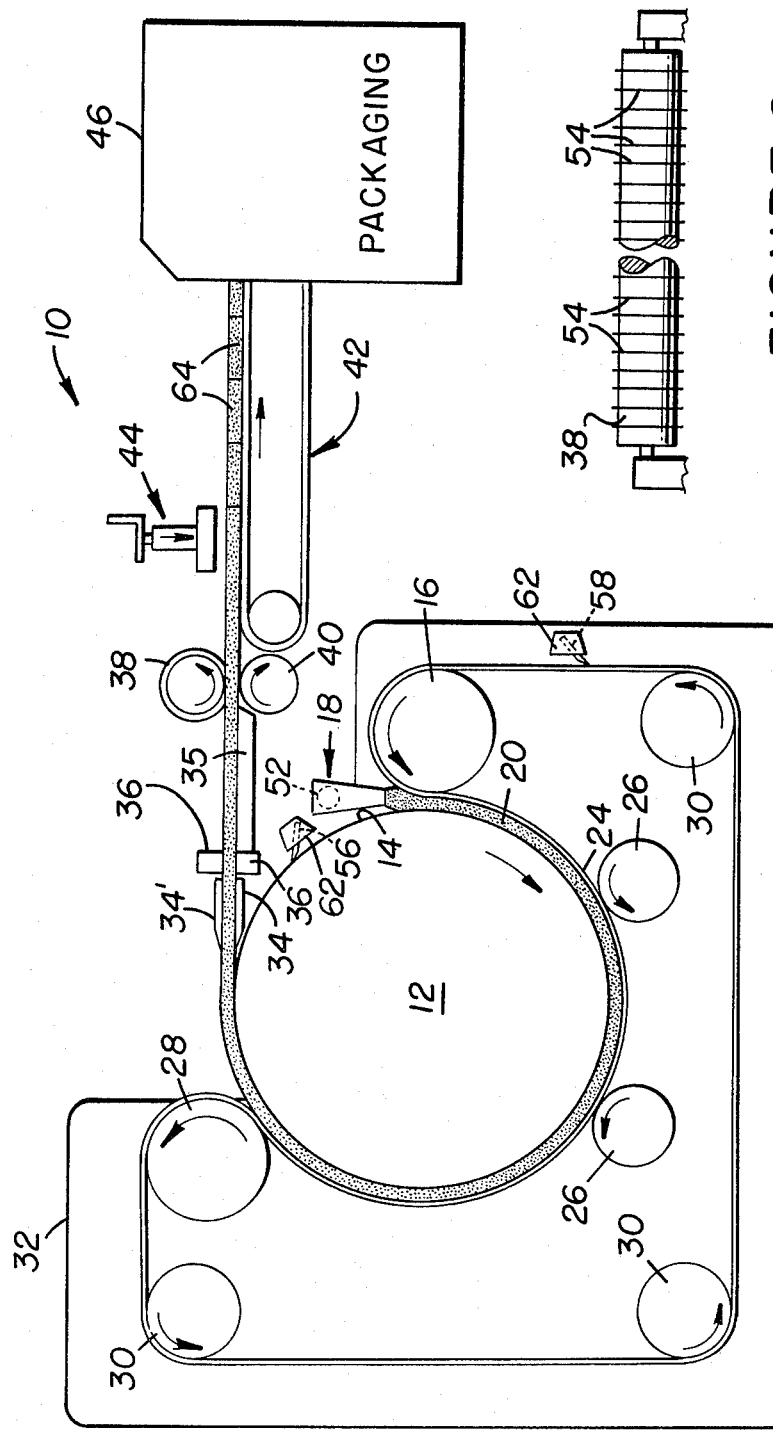
FIG. 1 is a generally schematic representation of apparatus for freezing and forming patties from protein material in accordance with the present invention.
FIG. 2 is a fragmentary view illustrating construction of a scoring roller also for use in conjunction with the apparatus of FIG. 1.

The present invention relates to improvements in a method and apparatus for freezing and forming protein-containing patties. Preferably, the patties are formed from ground meat. Accordingly, although the following description discusses the invention in terms of freezing and forming ground meat or hamburger patties, the invention also applies to freezing and forming patties which consist of other protein-containing materials such as those listed above.

Apparatus for freezing and forming patties is generally indicated at 10 in FIG. 1. Major components of the apparatus of FIG. 1 are briefly summarized below followed by a more detailed description of each of the components. A basic component of the freezing and forming apparatus 10 is a freezer drum 12 having an outer heat exchange surface 14. Ground meat having a generally viscous paste consistency is introduced into a nip between an application roller 16 and the drum 12 by suitable means 18 to form a sheet of material indicated at 20 on the outer surface 14 of the drum 12. The sheet of ground meat is formed between the drum and a refrigerated endless belt 24 trained about the application roller 16. The belt 24 is also preferably trained about a final roller 28. Intermediate pressure rollers 26 are also arranged to apply pressure to the sheet of ground meat through the belt which is also trained about a plurality of idler rollers 30.

The application roller 16 is preferably hollow and similarly refrigerated as the drum 12 so that both surfaces of the sheet 20 are uniformly cooled as soon as the sheet is formed. In addition, a refrigeration housing 32 assures that the belt 24 is maintained at a refrigerated temperature while it remains in contact with the sheet 20. With the belt being of a suitable material for rapidly transferring heat from the patty sheet, both sides of the sheet can be refrigerated or frozen at a similar rate.

As the sheet of ground meat passes from under the belt 24 in frozen condition, it is removed from the surface of the drum freezer by a knife-edge or blade 34. Similar knife means 34' assure release of the sheet from the belt 24. In FIG. 1, the final roller 28 is spaced apart from the knife edge 34. However, within the scope of this invention, positioning of the roller 28 on the drum could be widely varied. For example, it could be arranged closely adjacent the blade 34 and would then serve to assure that the sheet remains in engagement with the drum until contacting the blade 34.

Furthermore, other means than the blade 34' could be employed for causing the sheet to be released from the belt 24. For example, one alternative would include heater means (not otherwise shown) contained within the final roller 28 for heating the belt 24 and thereby causing the sheet to be released from the belt. Such heating means could be employed in place of or possibly in combination with the blade 34'.

The belt 24 serves a number of functions within the present invention. Initially, it may be seen that the belt is in engagement with the sheet from the point at which the sheet is formed adjacent the application roller 16. At that point, the belt conditions the outer surface of the sheet similarly as the surface of the drum 12. Similar conditioning for both surfaces of the sheet is facilitated by refrigeration of the application roller so that both surfaces of the sheet are similarly refrigerated by the drum and by the belt 24. Furthermore, the belt tends to produce and maintain uniform compression upon the sheet and to thereby control the thickness of the sheet. This function is further enhanced by the intermediate pressure rollers 26 which act upon the sheet through the belt 24. Otherwise, as noted above, the ground meat product has a sufficient moisture content and an initial temperature differential relative to the drum to assure its adhesion to the drum. However, even if adhesion were not provided between the drum and the sheet, the belt 24 would serve to maintain the sheet in intimate heat exchange engagement with the drum.

The blade 34 is also adapted to eliminate curvature tending to be produced within the sheet by its formation upon the surface of the drum 12. Since the sheet is refrigerated or frozen in place upon the drum, it tends to exhibit the same curvature as the drum. This curvature is particularly undesirable when the sheet is divided into patties and may even interfere with the cutting of the sheet into patties. Removal of the sheet from the drum by the blade 34 has been found to remove most if not all of the curvature from the sheet. However, it is further necessary to support the sheet in a flat configuration as it passes away from the blade 34. For this reason, an apron 35 provides a flat support surface arranged tangentially to the surface of the drum relative to the point at which the sheet is removed from the drum by the blade 34. Passage of the sheet over the apron 35 tends to maintain its flat configuration during further processing as described below.

Immediately after removal from the drum freezer surface, one or both surfaces of the sheet of ground meat are heated by suitable means 36 in order to thaw a thin surface segment of the sheet normally subject to dehydration and discoloration because of the rapid rate of freezing experienced by the patty sheet. The surfaces of the sheet are then allowed to refreeze more slowly in order to maintain desirable color.

The sheet then passes between rollers 38 and 40, to score its surfaces and facilitate or improve response of the patties to subsequent cooking. As the sheet is carried along a conveyor 42, stamping means 44 divide the sheet of frozen ground meat into individual patties 64. The individual patties are transferred by the conveyor 42 to a further processing station 46 where the frozen patties are packaged. The scoring rollers 38 and 40 could also be arranged after the stamping means 44 to score both surfaces of the individual patties.

Before proceeding with a more detailed description of the various components of the apparatus of FIG. 1, it is noted that the freezer drum 12, which is an important component of the invention, was described in detail by the references noted above. Thus, the freezer drum 12 together with the application or feed roller 16, the pressure rollers 26, the knife-edge means 34 and the stamping means 44 for forming individual patties were also described in one or more of those references. In addition, a method for freezing a sheet of protein-containing material upon such a drum was described in detail by one or more of the references. Accordingly, the description of each of the above-noted references is incorporated herein. The following description is directed primarily toward the additional components providing improvements in the method and apparatus for forming patties.

The means 18 for introducing the ground meat or protein-containing material includes an elongated device such as a screw feeder 52 for receiving the ground meat in a viscous paste form and applying it along the length of the nip formed between the drum 12 and the belt 24 on the application roller 16.

In accordance with the method disclosed in the reference last noted above, a selected differential temperature is maintained between the ground meat and the surface 14 of the drum freezer to assure that the meat adheres to the surface of the drum. This is particularly important in order to accomplish effective heat exchange between the drum and the ground meat. The belt is refrigerated as was also noted above to similarly assure effective heat exchange between the belt and the ground meat. Also in accordance with the disclosure of that reference, the pressure rollers 26 acts through the belt upon the ground meat while it is upon the surface of the rotating drum in order to maintain the ground meat in engagement with the drum surface 14 as well as to further compress the sheet on the drum. The sheet of ground meat is preferably engaged by the belt 24 the entire time it is upon the drum surface 14.

The belt 24 has a surface selected to properly condition the outer surface of the sheet 20. The belt 24 preferably has a smooth surface similar to the drum surface 14.

After the sheet 20 is removed from the drum freezer by the knife-edge 34, it passes between the heating elements 36 in order to thaw thin surface portions of the sheet tending to be susceptible to dehydration and to discoloration due to rapid freezing. The heating elements 36 are preferably light sources but could also be heated rollers or live steam sources for example. As soon as the sheet 20 passes beyond the heat lamps 36, the surface portions of the sheet tend to again be frozen at a lower rate by heat transfer with internal portions of the sheet. In this manner, normal color of the ground meat or protein material in the sheet is maintained.

The sheet 20 then passes between scoring rollers 38 and 40, one of which is illustrated in greater detail in FIG. 3. As may be seen in FIG. 3, each of the scoring rollers is arranged for rotation in the direction illustrated in FIG. 1 and includes a series of thin, concentric cutting edges 54. The cutting edges 54 serve to slightly score the surfaces of the sheet 20 in order to facilitate and improve response of the ground meat to cooking.

The sheet 20 then passes onto the conveyor 42 where it is divided into individual patties by stamping means 44. The stamping means 44 are preferably formed to cut the entire sheet into individual patties without producing any waste. It is particularly important that the individual patties be of the same size, thickness, density, weight, etc. The present method and apparatus for freezing and forming the patties are particularly selected to accomplish that goal. Thereafter, the individual patties are carried by the conveyor to the packaging station 46 where they are packaged for storage or shipment.

Within the apparatus described above in connection with FIG. 1, either the scoring rollers 38 and 40 or the stamping means 44 may also be employed to assist in straightening or removing curvature in the sheet 20 resulting from its being frozen and formed upon the curved outer surface 14 of the freezer drum 12. Cleaning devices such as the scrapers 56 and 58 act against the drum surface 14 and the belt 24 respectively in order to assure that the surfaces are free from frost or other material prior to application of the sheet 20 of ground meat. The cleaning devices 56 and 58 are preferably provided with hoods 62 adapted by means of a vacuum pump or the like to collect material removed from the freezer drum surface 14 and the belt 24.

The method of operation contemplated by the present invention is believed to be clearly apparent from the preceding description but is also described briefly below. Initially, ground meat or other protein-containing material is processed into a viscous paste consistency as is described in greater detail above in the above-noted references. It is a particular object of the present invention to form uniform individual patties from this viscous paste material. Preferably, a continuous sheet is first frozen upon the drum and then formed into patties.

The present invention also particularly contemplates a number of steps for improving quality of the uniform patties as described below.

It has been found that cooking characteristics of the individual patties are improved if both surfaces of the patty are similar. It is a relatively simple matter to condition the internal surface of the sheet of ground meat with the surface 14 of the freezer drum which is preferably smooth. The outer surface of the sheet 20 is similarly formed by the refrigerated rotating belt 24 so that the surfaces on both sides of the sheet are properly conditioned. The belt 24 also has a relatively smooth surface and engages the ground meat at the point of the application roller 16 where the ground meat is first formed into a sheet.

After the ground meat is frozen upon the drum 12, it is removed by the knife edges 34 and 34'. As noted above, the sheet is straightened to remove curvature produced by formation of the sheet upon the drum. Such curvature is primarily removed by interaction of the blade 34 as it separates the sheet from the drum. In order to prevent any curvature from being reintroduced into the sheet, an apron is provided in tangential relation to the drum at the point where the sheet is removed from the drum for supporting the sheet and maintaining its flat configuration. Thus, before the sheet is divided into patties or otherwise processed, the sheet is straightened among other reasons to prevent undesirable curling of the patties during subsequent cooking.

In addition to the combination of the blade 34 and the apron 35, additional means may be employed to further assure complete flattening of the sheet. For example, the scoring rollers 38 and 40 as well as the stamping means 44 tend to act upon the sheet and cause it to assume a straight configuration. It would also of course be possible to provide additional roller means specifically for the purpose of pressing the frozen sheet against either the apron 35 or the conveyor 42 in order to remove any remaining curvature in the sheet or patties.

After the frozen meat is removed from the drum, its surfaces are treated to remove discoloration resulting from rapid refrigeration as described above. Preferably, the surfaces of the meat are heated, by either a light source, live steam or heated rollers, and thereafter allowed to gradually refreeze in order to retain normal color of the ground meat or protein product.

The frozen sheet then passes between rollers 38 and 40 which form small cuts approximately one thirty-second to one-sixteenth inch deep in both surfaces of the meat. Here again, scoring has been found to particularly facilitate subsequent cooking of the patties.

The frozen sheet is then formed into individual patties by the stamping means indicated at 44. The individual patties are carried by the conveyor to a packaging station.

Additional variations and modifications are believed clearly apparent in the method and apparatus of the present invention as disclosed above. Accordingly, the scope of the invention is defined only by the following appended claims.

What is claimed is:

1. A method for freezing and forming individual patties of protein material, comprising the steps of
processing the protein material to form a viscous paste,
introducing the viscous paste into a nip formed between a rotating drum and an application roller for forming the viscous paste into a sheet having generally uniform thickness and density,
engaging the outer surface of the sheet of protein material opposite the rotating drum with an endless belt in order to condition the outer surface of the sheet of protein material, the endless belt being trained about the application roller and about additional rollers for maintaining the belt in engagement with said sheet upon the rotating drum,
refrigerating both the rotating drum and the application roller in order to similarly refrigerate and condition both surfaces of the sheet as it is formed between said drum and the endless belt trained about the application roller,
removing the sheet from the rotating drum after it is suitably refrigerated, and forming individual patties from the sheet of protein material.

2. The method of claim 1 wherein a temperature differential is maintained between the rotating drum and the protein material in order to assure adhesion of the protein material to the drum.

3. The method of claim 1 further comprising the step of scoring at least one surface of the sheet of protein material to improve its response to subsequent cooking.

4. The method of claim 1 further comprising means for removing surface discoloration from the sheet of protein material after its removal from the heat transfer surface.

5. The method of claim 4 wherein said surface discoloration is removed by heating a thin surface portion of the sheet and allowing it to thereafter be more slowly refrigerated.

6. The method of claim 1 wherin the endless belt and the rotating drum are arranged within a refrigerated chamber in order to more uniformly refrigerate the sheet of protein material.

7. The material of claim 1 wherein the protein material is selected to include a substantial portion of ground meat.

8. The method of claim 1 further comprising the step of cleaning the heat transfer surface after removal of the frozen sheet of protein material therefrom.

9. The method of claim 1 further comprising means for separating the sheet from the refrigerated drum and the belt.

10. The method of claim 9 wherein separate knife edges are provided for separating the sheet respectively from the drum and the endless belt.

11. The method of claim 9 wherein the endless belt is trained about a final roller including means to heat the endless belt for causing separation between the sheet and the endless belt.

12. The method of claim 1 further comprising means for straightening the sheet to eliminate curvature introduced by formation of the sheet upon the rotating drum, said straightening means comprising means for separating the sheet from the drum at a peripheral point of the drum and apron means arranged tangentially with the drum relative to the point at which the sheet is removed from the drum for supporting the sheet and maintaining it in a flat configuration.

13. A method for freezing a generally continuous sheet of protein material from which individual patties are to be formed, comprising the steps of
processing the protein material to form a viscous paste,
introducing the viscous paste into a nip formed between a refrigerated rotating drum and an application roller for forming the viscous paste into a sheet upon the refrigerated drum, the temperature differential between the heat transfer surface and the protein material being selected to assure adhesion of the protein material to the drum surface, maintaining the sheet in place upon the refrigerated drum until the sheet is suitably refrigerated, separating the sheet from the drum at a peripheral point on the drum surface and supporting the sheet upon a flat surface arranged tangentially to the drum relative to the point at which the sheet is separated from the drum for maintaining the sheet in a flat configuration whereby the frozen sheet is straightened to eliminate curvature produced in the sheet when it is frozen on the drum, the sheet being maintained in said straightened condition until the sheet is cut into patties, and cutting the flat sheet into individual patties in order to produce patties of superior quality and uniformity.

14. A method for freezing protein material, comprising the steps of processing the protein material to form a viscous paste, applying the viscous paste as a sheet upon a peripheral surface of a rotating refrigerated drum, maintaining the sheet upon the peripheral surface of the refrigerated drum in order to rapidly refrigerate the sheet, rapid refrigeration of the sheet producing a thin layer of discoloration upon the sheet surface, and removing the surface discoloration from the sheet by heating in order to thaw a thin surface portion of the sheet susceptible to dehydration and to discoloration and allowing it to thereafter be more slowly frozen by heat transfer with internal portions of the sheet.

15. The method of claim 14 further comprising the step of dividing the frozen sheet into individual patties.

* * * * *